(12) United States Patent
Lin et al.

(10) Patent No.: US 8,295,313 B2
(45) Date of Patent: Oct. 23, 2012

(54) VIDEO INSTANT MESSAGING SYSTEM AND METHOD THEREOF

(75) Inventors: Wen-Hwa Lin, Taipei Hsien (TW); Chun-Nan Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1224 days.

(21) Appl. No.: 12/104,670

(22) Filed: Apr. 17, 2008

(65) Prior Publication Data

US 2009/0167840 A1 Jul. 2, 2009

(30) Foreign Application Priority Data

Dec. 28, 2007 (CN) .......................... 2007 1 0203525

(51) Int. Cl.
*H04J 99/00* (2009.01)
(52) U.S. Cl. ........................................ 370/546; 382/118
(58) Field of Classification Search .................. None
See application file for complete search history.

(56) References Cited

U.S. PATENT DOCUMENTS

| | | | |
|---|---|---|---|
| 6,208,373 B1 | 3/2001 | Fong et al. | |
| 7,038,715 B1 * | 5/2006 | Flinchbaugh | 348/207.99 |
| 7,668,402 B2 | 2/2010 | Grindstaff et al. | |
| 2002/0191818 A1 * | 12/2002 | Matsuo et al. | 382/118 |
| 2004/0005086 A1 * | 1/2004 | Wolff et al. | 382/118 |
| 2007/0253598 A1 | 11/2007 | Yuasa et al. | |
| 2008/0025577 A1 * | 1/2008 | Kugo et al. | 382/118 |
| 2008/0166026 A1 * | 7/2008 | Huang et al. | 382/118 |

FOREIGN PATENT DOCUMENTS

| | | |
|---|---|---|
| CN | 1863301 A | 11/2006 |
| TW | 200629175 | 8/2006 |
| TW | 200707313 | 2/2007 |

OTHER PUBLICATIONS

Rowley et al. "Neural Network-Based Face Detection" PAMI, Jan. 1998.*

* cited by examiner

*Primary Examiner* — Chirag Shah
*Assistant Examiner* — Jenkey Van
(74) *Attorney, Agent, or Firm* — Altis Law Group, Inc.

(57) ABSTRACT

A video instant messaging method includes: picking up information in front of a display panel from different directions to capture a number of facial images; extracting a number of groups of characteristic vectors from the facial images respectively; measuring a number of degrees of similarity each associated with a extracted characteristic vector using a group of reference characteristic vector; calculating a number of total degrees of similarity each associated with a facial image using the measured degrees of similarity; and transmitting the facial image having the highest total degree of similarity.

17 Claims, 4 Drawing Sheets

VIDEO INSTANT MESSAGING SYSTEM AND METHOD THEREOF

BACKGROUND

1. Technical Field

The invention relates to a video instant messaging system and method.

2. Description of Related Art

Video instant messaging offers real-time communication and allows easy visual collaboration. Therefore, this methodology is popular and in widespread use. A typical video instant messaging system includes a video camera for video input, and a display for video output. The video camera is typically oriented to pick up information in front of the display at a fixed angle, assuming that the user always views the display at that angle. However, in reality, the face of the user is almost always moving throughout chatting/conferring, and deviates away from that angle, resulting in bad video.

Therefore, it is desirable to provide a video instant messaging system and method, which can overcome the above-mentioned problem.

SUMMARY

In a present embodiment, a video instant messaging method includes: picking up information in front of a display panel from different directions to capture a number of facial images; extracting a number of groups of characteristic vectors from the facial images respectively; measuring a number of degrees of similarity associated with an extracted characteristic vector using a group of reference characteristic vectors; calculating a number of total degrees of similarity associated with a facial image using the measured degrees of similarity; and transmitting the facial image having the highest total degree of similarity.

BRIEF DESCRIPTION OF THE DRAWINGS

Many aspects of the present video instant messaging system and method should be better understood with reference to the following drawings. The components in the drawings are not necessarily drawn to scale, the emphasis instead being placed upon clearly illustrating the principles of the present video instant messaging system and method. Moreover, in the drawings, like reference numerals designate corresponding parts throughout the several views.

DETAILED DESCRIPTION OF THE EMBODIMENTS

Embodiments of the present video instant messaging system and method will now be described in detail with reference to the drawings.

Figure 1:
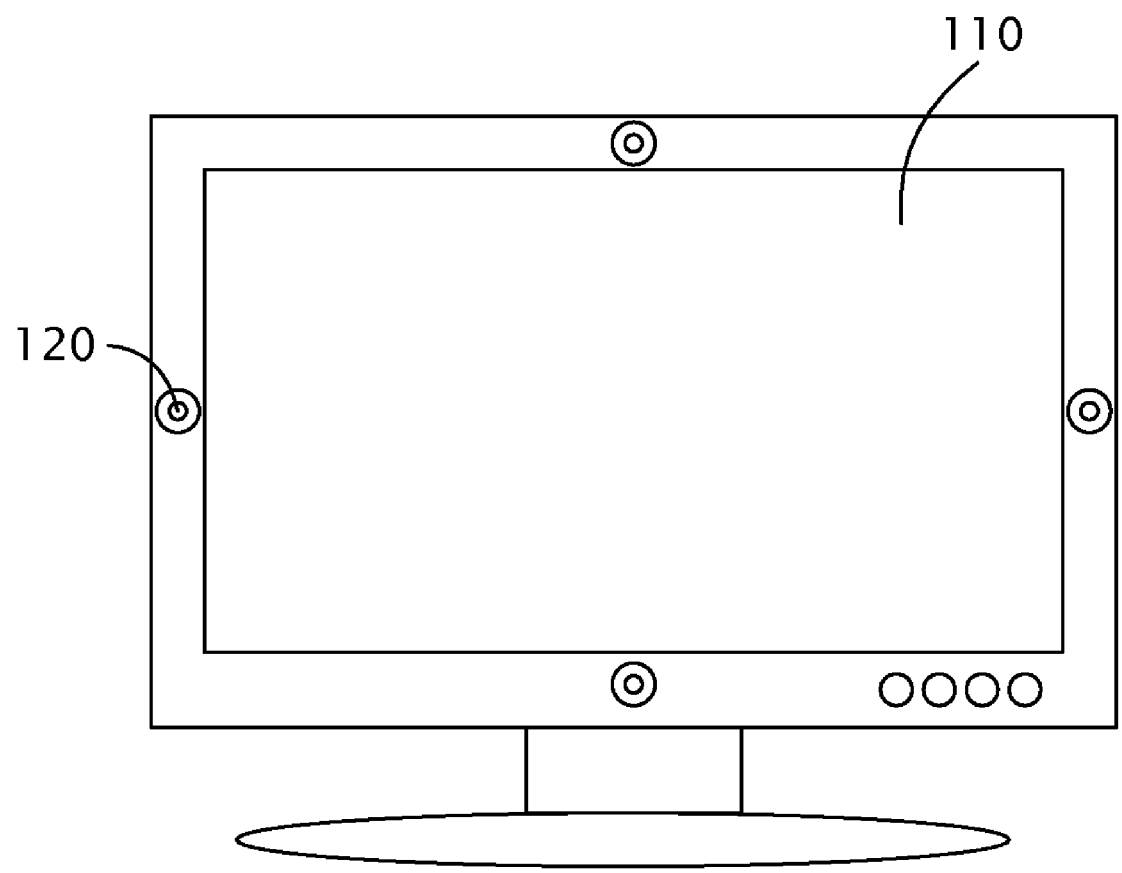
FIG. 1 is a front planar view of a video instant messaging system, according to an exemplary embodiment.
Figure 2:
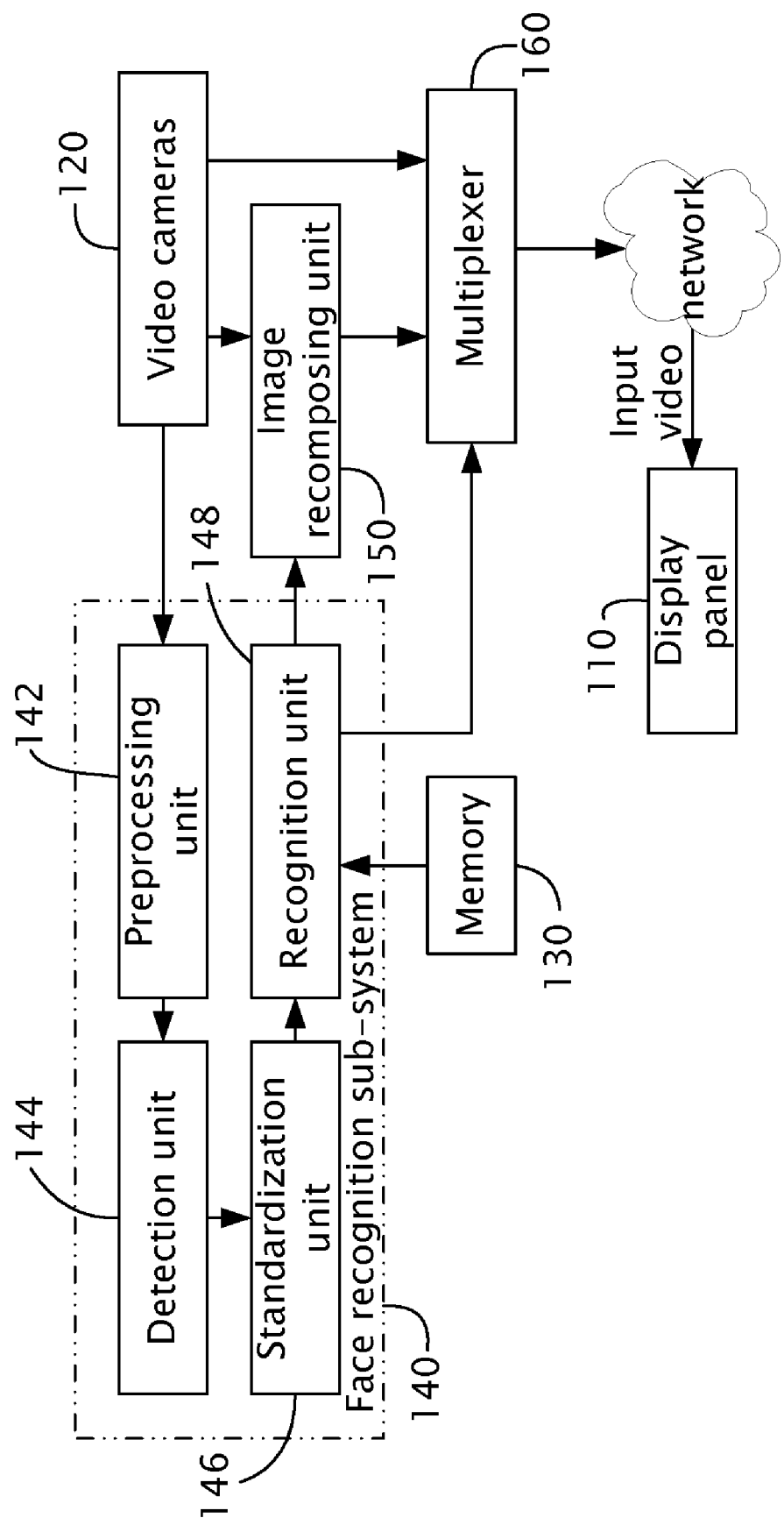
FIG. 2 is a functional diagram of the video instant messaging system, according to the exemplary embodiment.

Referring to FIGS. 1 and 2, a video instant messaging system 10, according to an exemplary embodiment, includes a display panel 110, four video cameras 120, a memory 130, a face recognition sub-system 140, an image recomposing unit 150, and a multiplexer 160.

The display panel 110 such as a liquid crystal display (LCD) panel is configured for video output (displaying video transmitted from remote end/s via a network, e.g., internet). The four video cameras 120 are configured for picking up information in front of the display panel 110 from different directions, and thereby capturing four videos. This information typically contains the face of the user when the user is viewing the display panel 110. Therefore each video includes a number of consecutive facial images of the user. The memory 130 is configured for storing a group of reference characteristic vectors extracted from facial image/s of the user in advance. The face recognition sub-system 140 is configured for extracting four groups of current characteristic vectors from four current facial images of the user respectively captured by the four video cameras 120, and measuring a number of degrees of similarity between each extracted current characteristic vector with a corresponding reference characteristic vector, and thereby calculating four total degrees of similarity each associated with a current captured facial image using the measured degrees of similarity. The image recomposing unit 150 is configured for decomposing each current captured facial image of the user into a number of feature areas, such as areas respectively containing eyes, nose, mouth, and chin, each of which is associated with a degree of similarity measured by the face recognition sub-system 140, and composing a new facial image using the decomposed feature areas having the highest total degree of similarity. The multiplexer 160 is configured for judging whether any calculated total degree of similarity exceeds a predetermined degree (stored therein), if yes, transmitting the current captured facial image of the user having the highest total degree of similarity, and, if no, transmitting the composed facial image to the remote end/s via the internet.

Understandably, when the video instant messaging system 10 is continuously working, a high quality video can be produced and transmitted.

In other alternative embodiments, the recomposing unit 150 may be omitted from the video instant messaging system 10, and the multiplexer 160 is only configured for transmitting the current captured facial image having the highest total degree of similarity.

The four video cameras 120 can be mounted on four edges of the display panel 110 respectively, or on external supporter/s. Understandably, the number of the video cameras 120 is not limited to four, but can be determined by the manufacturer or the user.

The reference characteristic vectors are advantageously extracted from facial image/s of high quality (e.g., high sharpness and contrast ratio) and therefore can clearly and exactly indicate the facial features of the user such as eyes, nose, mouth, and chin. Additionally, these extracted characteristic vectors are standardized in brightness and/or geometry to found a standard to which the face recognition sub-system 140 can accord, and thereby enhance overall recognition rate of the face recognition sub-system 140. Moreover, these reference characteristic vectors are indexed and stored in the memory 130 as a database.

The face recognition sub-system 140 includes a preprocessing unit 142, a detection unit 144, a standardization unit 146, and a recognition unit 148.

The preprocessing unit 142 is configured for preprocessing, for example, removing noise from or dividing, a current facial image such that the preprocessed current facial image is easy to be detected by the detection unit 144. The detection unit 144 is configured for detecting the edges of the facial features of the user (e.g., eyes, nose, mouth, and chin) in the preprocessed current facial image of the user, and extracting current characteristic vectors corresponding to the detected edges of the facial features. Many detection algorithms including nerve network, nerve network plus fast Fourier transform, fuzzy plus nerve network, RGB normalized color, fuzzy color, principle component analysis, and algorithm template, can be used by the detection unit 144. The standardization unit 146 is configured for standardizing the extracted characteristic vectors according to the standard of the reference characteristic vectors in brightness and/or geometry. The recognition unit 148 is configured for measuring a number of degrees of similarity between each standardized characteristic vector and the corresponding reference characteristic vector, and thereby calculating a total degree of similarity of the facial image. Many recognition algorithms including geometry approach, probability approach, and wavelet plus matching can be used in this recognition unit 148.

Understandably, the measured degrees of similarity and calculated total degree of the current facial image are indexed and buffered in the recognition unit 148 as a recognition result. Then, the recomposing unit 150 and the multiplexer 160 can work based upon the recognition result.

Various components of the video instant messaging system 10 such as the face recognition sub-system 140, the image recomposing unit 150, and the multiplexer 160 can be can be integrated into a single control unit. Alternatively, such components can instead be software instructions written via a variety of software languages, including C, C++, Java, Visual Basic, and many others, and can be executed by hardware such as an FPGA or an ASIC to acquire the above-mentioned functionality of the components.

Figure 3:
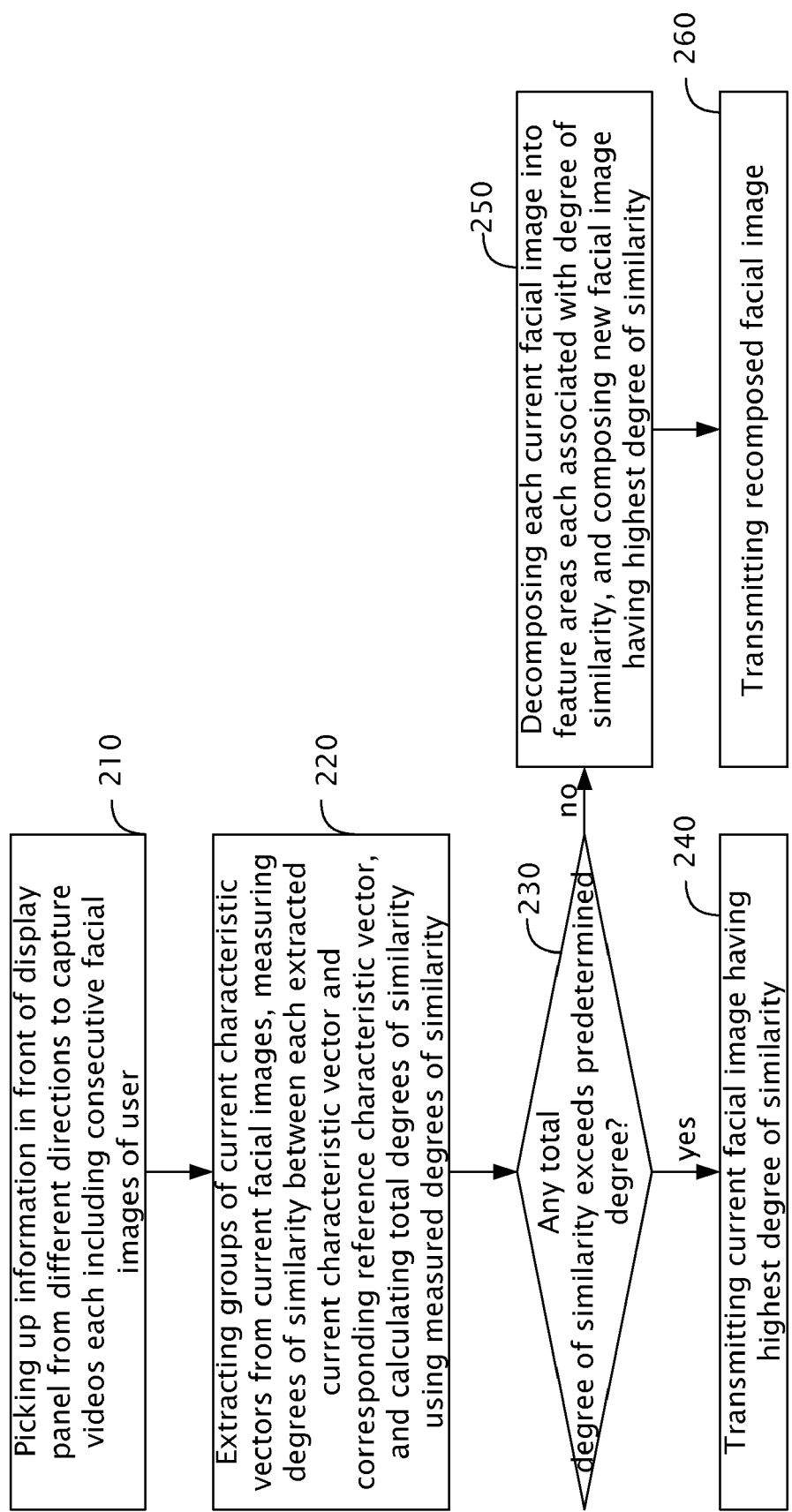
FIG. 3 is a flow chart of a video instant messaging method, according to another exemplary embodiment.

Referring to FIG. 3, a video instant messaging method, according to another exemplary embodiment, can be performed by, for example, the video instant messaging system 10, and includes the following operations 210~260.

Operation 210: picking up information in front of the display panel 110 from different directions to form a number of videos each including a number of consecutive facial images of the user. This is carried out by the four video cameras 120 after the video instant messaging system 10 is powered on.

Figure 4:
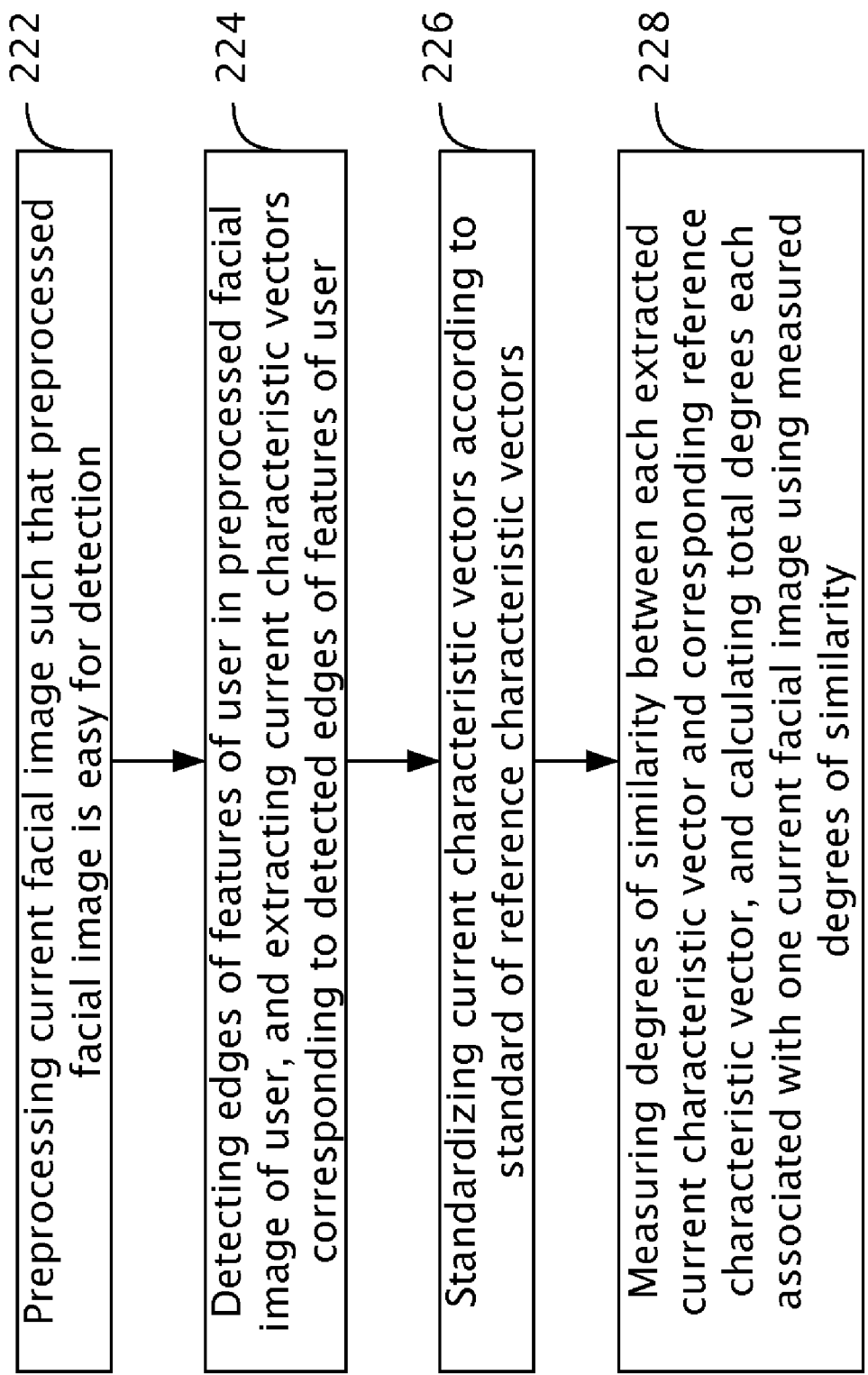
FIG. 4 is a sub-flow chart of the video instant messaging method of FIG. 3.

Operation 220: extracting a number of groups of current characteristic vectors from a number of current facial images, and measuring a number of degrees of similarity between each extracted current characteristic vector and a corresponding reference characteristic vector, and thereby calculating a number of total degrees of similarity each associated with a current facial image using the measured degrees of similarity. This is carried out by the face recognition sub-system 140. In particular, this operation can by carried out by the following sub-operations 222~228 (see FIG. 4).

Sub-operation 222: preprocessing (including e.g., noise removing and/or image dividing) a current facial image such that the preprocessed current facial image is easy to be detected. This is carried out by the preprocessing unit 142.

Sub-operation 224: detecting the edges of the facial features of the user in the preprocessed current facial image of the user and extracting current characteristic vectors corresponding to the detected edges of the facial features of the user. This is carried out by the detection unit 144. Many detection algorithms including nerve network, nerve network plus fast Fourier transform, fuzzy plus nerve network, RGB normalized color, fuzzy color, principle component analysis, and algorithm template, can be used in this sub-operation.

Sub-operation 226: standardizing the extracted current characteristic vectors in brightness and/or geometry, according to the standard of the reference characteristic vectors. This is carried out by the standardization unit 146.

Sub-operation 228: measuring a number of degrees of similarity between each standardized current characteristic vector and a corresponding reference characteristic vector, and thereby calculating a total degree of similarity of the facial image. This is carried out by the recognition unit 148. Many recognition algorithms including geometry approach, probability approach, and wavelet plus matching can be used during measuring. As an example, a total degree of similarity associated with a facial image can be calculated as follows: if the measured degrees of similarity of the facial image are eyes 90%, nose 85%, mouth 80%, and chin 75%, then the total degree of similarity is (90%+85%+80%+75%)/4=82.5%. That is, a total degree of similarity of a facial image is the mean value of degrees of similarity included in the facial image. Also, weighting factor/s can be added when calculating the total degree of similarity to emphasize any feature, e.g., eyes, of the facial image on the assumption that that feature is more important in video communication.

Operation 230: judging whether any calculated total degree of similarity exceeds a predetermined degree, if yes, going to the operation 240, and, if no, going to the operation 250. This is carried out by the multiplexer 160. In particular, the multiplexer 160 stores a predetermined degree, compares each measured degree of similarity with the predetermined degree, and finds out whether any measured degree of similarity exceeds the predetermined degree.

Operation 240: transmitting the current facial image having the highest total degree of similarity. This is carried out by the multiplexer 160. In detail, the multiplexer 160 compares the calculated total degrees of similarity, finds out the highest one, and transmits the current facial image associated therewith.

Operation 250: decomposing each current facial image into a number of feature areas each associated with a degree of similarity, and composing a new facial image using the feature areas having the highest total degree of similarity. This is carried out by the recomposing unit 150. In detail, the recomposing unit 150 is activated by the multiplexer 160 when no total degree of similarity exceeds the predetermined degree, and next performs the operation 250.

Operation 260: transmitting the composed facial image. This is carried out by the multiplexer 160.

Understandably, in other alternative method embodiments using the video instant messaging system 10 without the image recomposing unit 150, the operations 230, 250, 260 are omitted. That is, the method flow directly goes to the operation 240 after the operation 220.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A method for video instant messaging, comprising:
   picking up information in front of a display panel from different directions to capture a plurality of facial images;
   extracting a plurality of groups of current characteristic vectors from the facial images respectively;
   measuring a plurality of degrees of similarity each associated with an extracted current characteristic vector using a group of reference characteristic vectors;

calculating a plurality of total degrees of similarity each associated with a facial image using the measured degrees of similarity;

transmitting the facial image having a highest total degree of similarity:

judging whether any calculated total degree of similarity exceeds a predetermined degree;

when any calculated total degree of similarity exceeds the predetermined degree, going to the step of transmitting the facial image having the highest total degree of similarity; and when no calculated total degree of similarity exceeds the predetermined degree, decomposing each current facial image into a plurality of feature areas each associated with a measured degree of similarity, composing a new facial image using the feature areas having the highest total degree of similarity, and transmitting the composed facial image.

2. The method as claimed in claim 1, wherein extracting a group of current characteristic vectors from a facial image of the user is performed using a technique selected from a group of: nerve network, nerve network plus fast Fourier transform, fuzzy plus nerve network, RGB normalized color, fuzzy color, principle component analysis, and algorithm template.

3. The method as claimed in claim 1, wherein extracting a group of current characteristic vectors from a facial image of the user comprises:

detecting the edges of facial features of the user in the facial image of the user; and extracting the current characteristic vectors corresponding to the detected edges of the facial features.

4. The method as claimed in claim 3, further comprising:

preprocessing a facial image such that the preprocessed facial image is easy to be detected.

5. The method as claimed in claim 4, wherein preprocessing a facial image comprises:

removing noise from the facial image; and dividing the facial image.

6. The method as claimed in claim 1, further comprising:

standardizing the extracted characteristic vectors according to a standard of the group of reference characteristic vectors.

7. The method as claimed in claim 6, wherein standardizing the extracted characteristic vectors is performed in brightness.

8. The method as claimed in claim 6, wherein standardizing the extracted characteristic vectors is performed in geometry.

9. The method as claimed in claim 1, wherein measuring a degree of similarity associated with an extracted characteristic vector is performed using a technique selected from a group of: geometry approach, probability approach, and wavelet plus matching can be used during measuring.

10. The method as claimed in claim 1, wherein a total degree of similarity of a current facial image is a mean value of measured degrees of similarity of the current facial image.

11. The method as claimed in claim 1, further comprising:

displaying a video transmitted from a remote end via a network.

12. A video instant messaging system, comprising:

a display panel for video output;

a plurality of video cameras for picking up information in front of the display panel from different directions to capture a plurality of current facial images of the user;

a memory for storing a group of reference characteristic vectors extracted from a facial image of the user in advance;

a face recognition sub-system for extracting a plurality of groups of current characteristic vectors from the facial images of the user respectively, measuring a plurality of degree of similarity between each extracted current characteristic vector and a corresponding reference characteristic vector, and calculating a plurality of total degrees of similarity each associated with a facial image using the measured degrees of similarity;

a multiplexer for transmitting the facial image having a highest total degree of similarity;

a recomposing unit for decomposing each facial image into a plurality of feature areas each associated with a measured degree of similarity and composing a new facial image using the feature areas having the highest total degree of similarity, the multiplexer further being configured for judging whether any calculated total degree of similarity exceeds a predetermined degree, when any calculated total degree of similarity exceeds the predetermined degree, transmitting the facial image having the highest total degree of similarity; and, when no calculated total degree of similarity exceeds the predetermined degree, transmitting the composed facial image.

13. The video instant messaging system as claimed in claim 12, wherein the face recognition sub-system comprises:

a detection unit for detecting a plurality of edges of facial features of the user in a facial image of the user and extracting the current characteristic vectors corresponding to the detected edges of the facial features of the user; and a recognition unit for measuring a plurality of degrees of similarity between each extracted current characteristic vector and a corresponding reference characteristic vector, and calculating a total degrees of similarity associated with the facial image of the user using the measured degrees of similarity.

14. The video instant messaging system as claimed in claim 13, wherein the detection unit is configured for detecting the edges of the features of the user including at least two features selected from a group of: eyes, nose, mouth, and chin.

15. The video instant messaging system as claimed in claim 13, wherein the face recognition sub-system comprises a preprocessing unit for preprocessing a facial image such that the preprocessed facial image is easy to be detected.

16. The video instant messaging system as claimed in claim 12, wherein the face recognition sub-system comprises a standardization unit for standardizing the extracted current characteristic vectors according to a standard of the group of reference characteristic vectors.

17. The video instant messaging system as claimed in claim 16, wherein the standardization unit is configured for standardizing the extracted current characteristic vectors in brightness and geometry.

* * * * *